United States Patent [19]

Becker

[11] Patent Number: 4,682,638
[45] Date of Patent: Jul. 28, 1987

[54] STUMP-EXTRACTING TOOL

[76] Inventor: André Becker, 54 rue Saint Vincent, Bulligny, 54170 Colombey Les Belles, France

[21] Appl. No.: 721,845

[22] Filed: Apr. 9, 1985

[30] Foreign Application Priority Data

Apr. 13, 1984 [FR] France ............................ 84 05900

[51] Int. Cl.⁴ .......................................... A01G 23/08
[52] U.S. Cl. .................................. 144/2 N; 144/34 F
[58] Field of Search ............................ 144/2 N, 34 F

[56] References Cited

U.S. PATENT DOCUMENTS

| | | | |
|---|---|---|---|
| 2,934,108 | 4/1960 | Bles | 144/34 F |
| 2,966,180 | 12/1960 | Bles | |
| 3,119,421 | 1/1964 | Marine | 144/34 F |
| 4,094,348 | 6/1978 | Wolf | |
| 4,164,247 | 8/1979 | Wolf | |

Primary Examiner—W. D. Bray
Attorney, Agent, or Firm—Young & Thompson

[57] ABSTRACT

A stump-extracting tool preferably mounted on an articulated arm such as the boom of a power shovel has a flat spur (1) of substantial length having a cutting edge (2) at one end and a cutter-blade (5) in a plane transverse to the plane of the spur (1). The cutter-blade (5) comprises at least one cutting edge on one side adjacent to the cutting edge (2) of the spur (1) and the cutting edge of the cutter-blade (5) comprises a series of stair-step teeth (6) having a cutting edge (7) parallel to a plane (P) which is substantially perpendicular to the plane of the spur.

11 Claims, 6 Drawing Figures

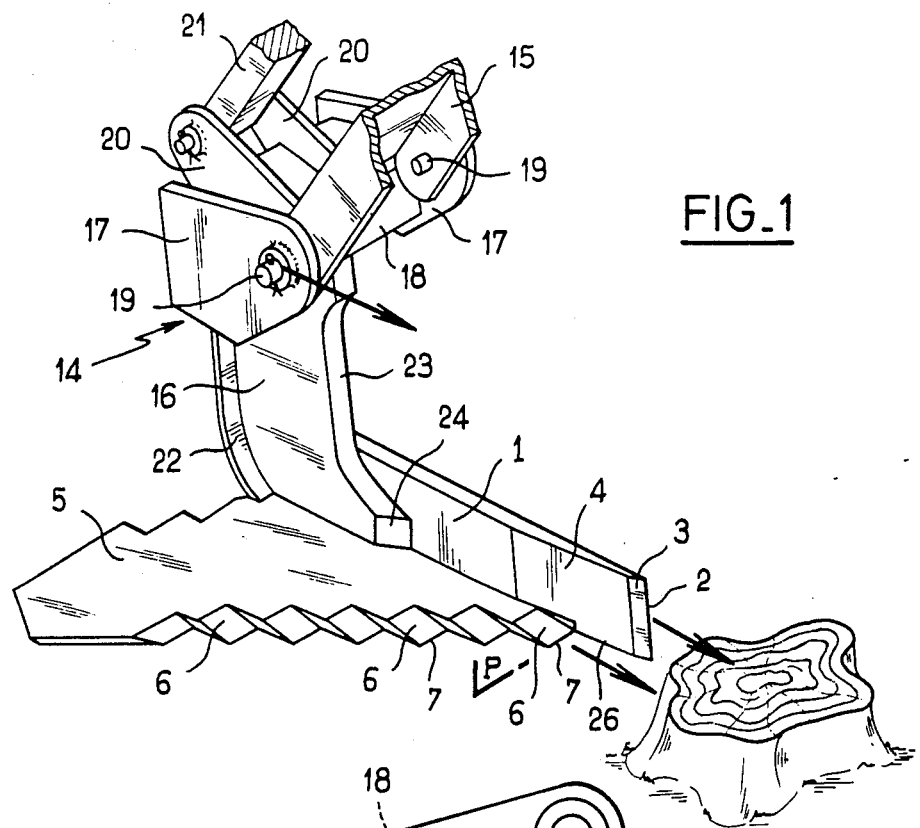
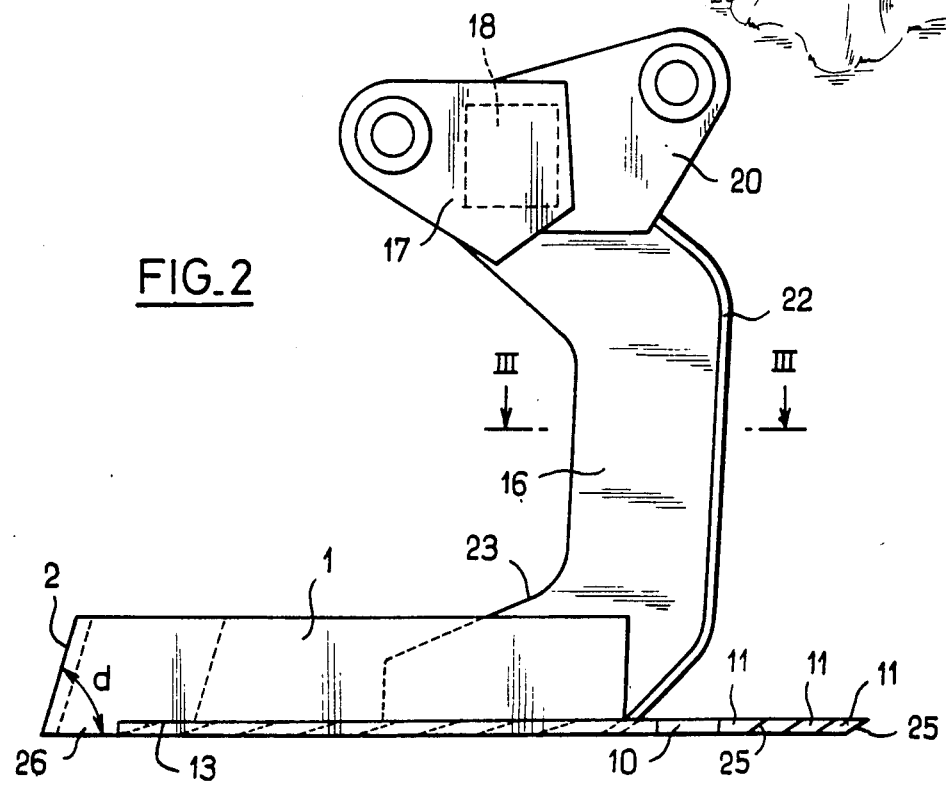

STUMP-EXTRACTING TOOL

BACKGROUND OF THE INVENTION

1. Field of the Invention

The present invention relates to a stump-extracting tool.

2. Description of the Prior Art

It is known that, when felling trees, the tree-stumps have to be destroyed in order to permit earthwork, excavation work or preparation of ground for cultivation of crops.

The most elementary method of tree-stump extraction is to dig right round the stump and then to extract it. However, there are many disadvantages attached to this method. In particular, the operation just mentioned is highly time-consuming and makes it necessary to displace a considerable volume of soil. Furthermore, the tree-stump is finally extracted in one piece and is difficult to destroy by incineration, for example.

In order to circumvent these drawbacks, various stump-extracting tools have already been proposed. One type of tool which is worthy of mention comprises a pivoting blade mounted at the end of an arm opposite to a ledger-plate in accordance with a structure which is similar to that of a very large pair of secateurs. Tools of this type make it possible only to split a tree-stump vertically but do not permit easy extraction of large stump fragments, with the result that they have not led to any practical development.

Another type of stump-extracting tool described in U.S. Pat. No. 4,094,348 comprises a flat spur of substantial length having a cutting edge at one end and provided with a cutter-blade in a plane which is transverse to the plane of the spur. The cutter-blade has a series of teeth which are directed obliquely with respect to the plane of the spur. Tools of this type make it possible to split the stump down to a certain depth and to cut-up part of the stump in much the same manner as a plowshare.

However, by reason of the oblique orientation of the teeth, these tools are subjected to a strong lateral reaction which is sustained by the spur and their structure has to be reinforced in order to withstand the forces developed, thus making tools of this type very cumbersome. In consequence, it is necessary to hitch them to the front end of heavy-duty vehicles which are capable of maneuvering only with difficulty on sloping ground or in marshy terrain.

SUMMARY OF THE INVENTION

In order to overcome these disadvantages, the invention proposes a stump-extracting tool comprising a flat spur of substantial length having a cutting edge at one end and a cutter-blade in a plane transverse to the plane of the spur. The cutter-blade comprises a series of stair-step teeth having a cutting edge on one side adjacent to the cutting edge of the spur. The distinctive feature of the tool lies in the fact that the cutting edge of the stair-step teeth is parallel to a plane substantially perpendicular to the plane of the spur.

It has been found that the successive teeth of the cutting edge of the cutter-blade produce instantaneous breaking-up of cut portions of tree-stump, with the result that a highly effective job is achieved with the minimum effort.

According to another aspect of the invention, the cutter-blade has a heel provided with a heel cutting-edge on that side of the cutter-blade which is opposite to the cutting edge of the spur.

It is thus possible to prevent lifting of roots on the side opposite to the side of the stump which is being cut, this result being achieved by preliminary cutting of these roots by means of the heel cutting-edge.

According to an advantageous feature of this aspect of the invention, the heel cutting-edge is provided with a series of stair-step teeth having a cutting edge parallel to a plane perpendicular to the plane of the spur. The heel cutting-edge is thus endowed with the same advantages as those offered by the cutting edge which is adjacent to the cutting edge of the spur.

In a preferred embodiment of this aspect of the invention, the teeth of the heel cutting-edge are beveled on one face, the beveled face being directed downwards. Thus the downward action of the tool is controlled more effectively.

According to yet another aspect of the invention, the cutter-blade is provided with a heel having a salient angle which forms a knife-edge tip. The stump-extracting tool can thus be employed at the time of felling of a tree for guiding the tree as it falls.

In an advantageous embodiment of the invention in the different aspects thereof, the stump-extracting tool comprises means for coupling with an articulated boom. Thus the tool can be employed on sloping or marshy ground so that the vehicle which carries the boom remains on flat and firm ground while the tool is being displaced at a distance from the vehicle.

BRIEF DESCRIPTION OF THE DRAWINGS

Other features of the invention will be more apparent upon consideration of the following description and accompanying drawings, wherein:

FIG. 1 is a perspective view of the stump-extracting tool in accordance with the invention;

FIG. 2 is a side view of the stump-extracting tool;

DESCRIPTION OF THE PREFERRED EMBODIMENTS

Figure 3:
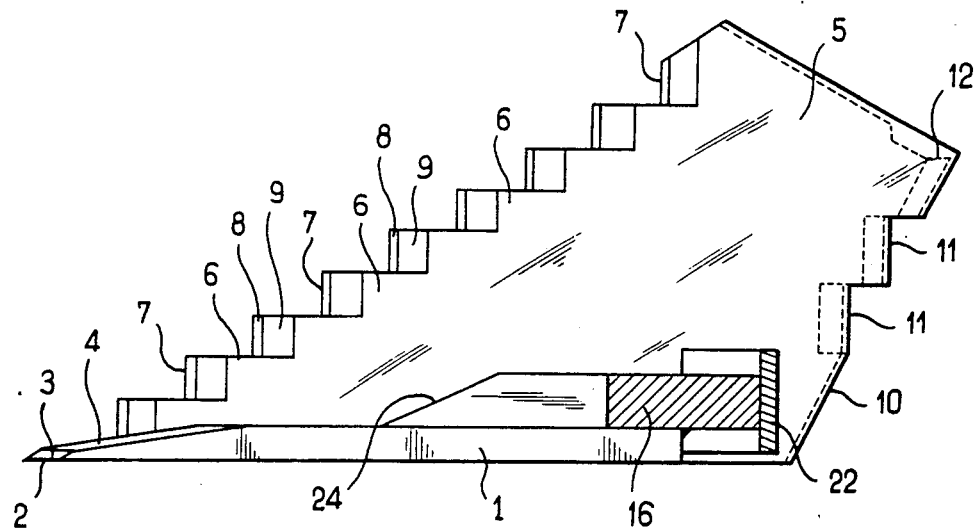
FIG. 3 is a top view taken along the plane of section III—III of FIG. 2.

Reference being made to the figures, the stump-extracting tool comprises a flat spur 1 of substantial length and provided with a cutting edge 2 formed by a beveled portion 3 which forms a cutting angle and is contiguous with a beveled portion 4 forming a rake angle.

The stump-extracting tool further comprises a cutter-blade 5 attached to the spur 1 by means of a welded joint, for example, extending in a plane transverse to the plane of the spur 1.

In the embodiment illustrated, the bottom edge 13 of the spur 1 is welded to the top face of the cutter-blade 5 which extends beneath the spur. Said spur is provided at the front end with a shouldered portion 26 which ensures that its bottom edge coincides with the bottom face of the cutter-blade.

Figure 4:
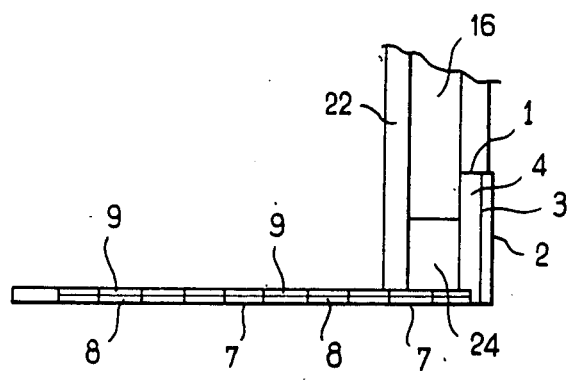
FIG. 4 is a front view of the bottom portion of the stump-extracting tool.

In accordance with the invention, the cutter-blade 5 comprises a series of stair-step teeth 6 each having a cutting edge 7 parallel to a plane P which is substantially perpendicular to the plane of the spur 1. Thus, as illustrated in FIGS. 3 and 4, the cutting edge 7 of each tooth 6 is preferably formed by means of a beveled portion 8 which is directed upwards to form a cutting angle and is contiguous with a beveled portion 9 which is also directed upwards and forms a rake angle.

On the side of the cutter-blade 5 remote from the cutting edge 2 of the spur 1, said cutter-blade 5 has a heel cutting-edge 10 which extends obliquely with respect to the plane of the spur 1. In the advantageous embodiment shown, the heel cutting-edge 10 comprises a series of stair-step teeth 11 having a cutting edge parallel to the plane P which is perpendicular to the plane of the spur 1.

As can be seen in FIG. 2, the teeth 11 of the heel cutting-edge 10 have a downwardly-directed beveled edge 25 formed on one face of each tooth.

In the embodiment shown in the drawings, the cutter-blade 5 is provided with a heel-tip which forms a salient angle 12 with a cutting edge.

According to a further aspect of the invention, the cutting edge 2 of the spur 1 is inclined with respect to the bottom edge 13 of the spur 1 at an angle d which is smaller than 90°.

In the preferred embodiment, the stump-extracting tool comprises means 14 for coupling with an articulated arm 15 such as, for example, the pivoted boom of a mechanical power shovel of the hydraulic power transmission type. Said coupling means 14 comprise a support plate 16 placed at the rear end of the spur and of the cutter-blade and maintained applied against the spur by means of a weld fillet, for example.

Coupling of the support plate 16 with the pivoted boom 15 is effected for example by means of gusset-plates 17 which are welded to the sides of a cross-member 18 and pivotally attached to the boom 15 by means of pivot-pins 19.

In the embodiment shown, the coupling means also comprise gusset-plates 20 fixed on the cross-member 18 and pivotally attached to an orientation member 21 which is adapted to cooperate with the articulated boom 15 by making use of conventional means such as mechanical power shovels which are already known per se and consequently do not need to be described in detail.

In order to prevent twisting of the support plate 16, it is preferable to provide a reinforcement plate 22 which extends at right angles to said support plate and is fixed along the rear edge of this latter.

The support plate 16 has a front edge 23 which is curved towards the cutting edge 2 of the spur 1 and terminates in a beveled nose 24 which is inclined in the same direction as the beveled face 3, 4 of the cutting edge of the spur 1.

At the time of use, the tool is preferably mounted on the pivoted boom of a mechanical shovel of the hydraulic power transmission type and is moved to a position behind the tree-stump to be removed as illustrated in FIG. 1.

The cutting edge 2 of the spur 1 is brought into position against the stump, then drawn in a direction parallel to the plane of the spur 1 as indicated by the arrows in FIG. 1. The spur splits the stump as it penetrates into this latter whilst the teeth have the effect of progressively cutting horizontal slices which break-up as the teeth advance. In consequence, any friction or "binding" action produced on the second tooth by that portion of stump which is being cut by the first tooth is practically negligble and the same applies to the following teeth with respect to the preceding teeth. It is therefore found that the stair-step teeth having cutting edges located substantially at right angles to the plane of the spur offer the double advantage of a considerable reduction in the lateral stress exerted on the cutter-blade and of progressive break-up of each cut slice of stump, thereby minimizing friction between the stump and the cutter-blade and consequently minimizing the energy required for removing the stump.

In the case of large tree-stumps of hard wood, only the first two teeth of the extractor produce effective action whereas the tool can be utilized to the full extent in the case of easy stump extraction such as coppice and thornbush stumps or the like. Moreover, the width of the cutter-blade 5 permits removal of earth and wood chips while work on large tree-stumps is in progress.

It will also be observed that the arrangement of the support plate 16 behind the cutter-blade 5 and its position next to the spur 1 result in a structure which permits not only a reduction in friction between cutter-blade and stump but also displacement of the tool in a position which is particularly well-suited for making the best possible use of the forces applied to the tool by the pivoted boom 15.

In the case of large tree-stumps, certain parts of the stump and especially thick roots may occasionally be dragged by the tool instead of breaking-up under the pressure exerted by this latter. A reaction thus takes place, with the result that these dragged fragments have a tendency to dig into the ground in front of the stump, that is to say on the opposite side of the stump with respect to the work location of the extracting tool. In order to guard against this ground-digging phenomenon, a desirable expedient consists in cutting the roots in front of the stump. This operation is accordingly performed by the heel cutting-edge 10 and the teeth 11 provided at the rear end of the tool.

When it is desired to fell a tree and to cause it to fall in a direction other than the direction in which it would naturally tend to fall, the heel-tip 12 with its cutting edge is used as a support. In this case, the heel-tip 12 is driven into the tree prior to felling. Progressively as the tree is being sawn at the base, the tree is thrust back while exerting a force on the tool in the desired direction.

In the embodiment shown in FIGS. 1 to 4, the stump-extracting tool is operated by displacing the pivoted boom 15 while at the same time adapting the relative position of the tool by means of the orientation member 21. In the case of a hydraulic power shovel, this accordingly entails the use, not only of the jacks of the orientation member 21, but also of the operating jacks of the boom 15 which correspond to high power consumption.

Figure 5:
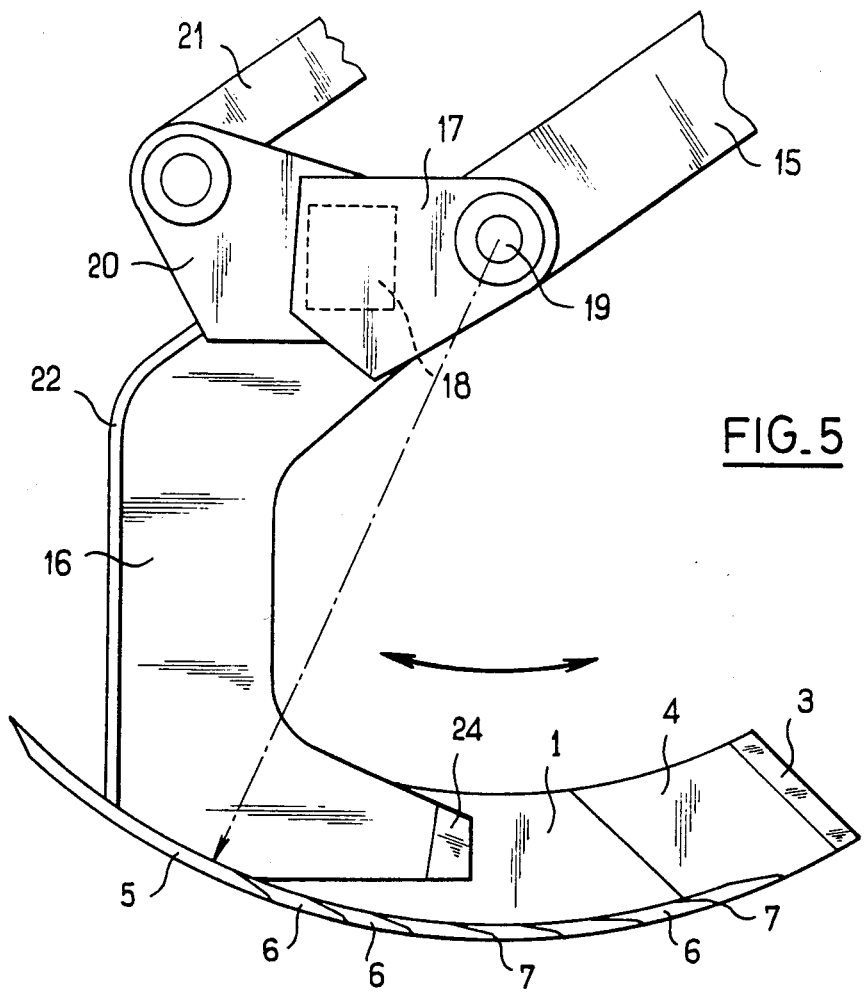
FIG. 5 is a side view of an alternative embodiment of the invention.

In the case of small tree-stumps, it has therefore been considered preferable to employ a tool which is easier to handle as illustrated in FIG. 5. The general structure of this tool is identical with that of the tool described earlier and identical reference numerals are therefore used. In this alternative embodiment, the cutter-blade 5 has the shape of a portion of cylinder, the axis of which coincides with the pins 19 for pivotal displacement of the tool on the boom or articulated arm 15. At least the bottom edge of the spur 1 is also curved in order to ensure that it does not project beneath the cutter-blade. Thus the tool can be operated by leaving the boom 15 practically motionless and by producing a pivotal displacement of the tool alone by means of the orientation member 21. The power consumed by the hydraulic shovel unit is therefore reduced to a minimum.

Figure 6:
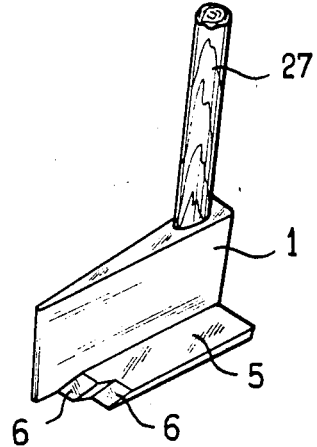
FIG. 6 is a perspective view of a stump-extracting hand-tool in accordance with the invention.

There is illustrated in FIG. 6 an alternative form of construction for a stump-extracting hand-tool which is suitable for very small stumps. The general structure is again identical with the embodiments described in the foregoing. In this case, however, the support plate 16 is replaced by a handle 27 which is secured to the spur 1 in the same manner as an axe-handle. In order to guard against excessive resistance of the tool at the time of penetration into the stump, the cutter-blade 5 preferably comprises only two teeth.

As will readily apparent, the invention is not limited to the embodiments described in the foregoing and alternative forms of construction may accordingly be contemplated.

Thus the stump-extracting tool in accordance with the invention can be employed in a conventional manner at the front end of a vehicle such as a tractor. It will be readily apparent that the cutter-blade 5 will not be provided with a rear cutting edge in this instance.

Similarly, although an angle d of less than 90° is conducive to easy penetration of the cutting edge 2 of the spur 1 into the stump and also serves to provide maximum compensation for the more rapid wear of the bottom portion of the cutting edge 2, provision can be made in accordance with conventional practice for a cutting edge 2 which is perpendicular to the bottom edge 13 of the spur 1.

Instead of providing teeth 7 having uniform dimensions, the width of each tooth can become progressively smaller as the distance between said tooth and the spur 1 becomes greater.

If so required, the spur 1 may project to only a short distance with respect to the first tooth 7.

What is claimed is:

1. A stump-extracting tool comprising a flat spur (1) of substantial length having a forward cutting edge (2) at one end and a cutter-blade (5) transverse to the plane of the spur (1), the cutter-blade (5) being provided with a series of stair-step teeth (6) having each respectively a forward cutting edge (7) perpendicular to the plane of the spur (1).

2. A stump-extracting tool according to claim 1, wherein the cutter-blade has a heel provided with a heel cutting-edge (10) on that side of the cutter-blade (5) which is opposite to the cutting edge (2) of the spur (1).

3. A stump-extracting tool according to claim 2, wherein the heel cutting-edge (10) is provided with a series of stair-step teeth (11) having a cutting edge substantially perpendicular to the plane of the spur (1).

4. A stump-extracting tool according to claim 3, wherein the teeth (11) of the heel cutting-edge (10) are beveled on one face, the beveled face (25) being directed downwards.

5. A stump-extracting tool according to claim 4, wherein the cutter-blade (5) is provided with a heel having a salient angle which forms a knife-edge tip (12).

6. A stump-extracting tool according to claim 5, wherein the cutting edge (2) of the spur (1) is inclined with respect to the bottom edge (13) of the spur (1) at an angle (d) which is smaller than 90°.

7. A stump-extracting tool according to claim 6, wherein said tool comprises means (14) for coupling with an articulated boom (15) of a hydraulic power shovel.

8. A stump-extracting tool according to claim 7, wherein the coupling means (14) comprise a support plate (16) fixed to the rear end of the spur (1) and of the cutter-blade (5).

9. A stump-extracting tool according to claim 8, wherein the support plate (16) is mounted against the spur (1).

10. A stump-extracting tool according to claim 9, wherein the support plate (16) comprises a reinforcement plate (22) placed along the rear edge of the support plate (16) at right angles to said plate.

11. A stump-extracting tool according to claim 10, wherein the cutter-blade (5) comprises a portion of a cylinder centered on pivoting means (19) for pivotal displacement of the tool with respect to the articulated boom (15) of a hydraulic power shovel.

* * * * *